United States Patent Office 2,794,291
Patented June 4, 1957

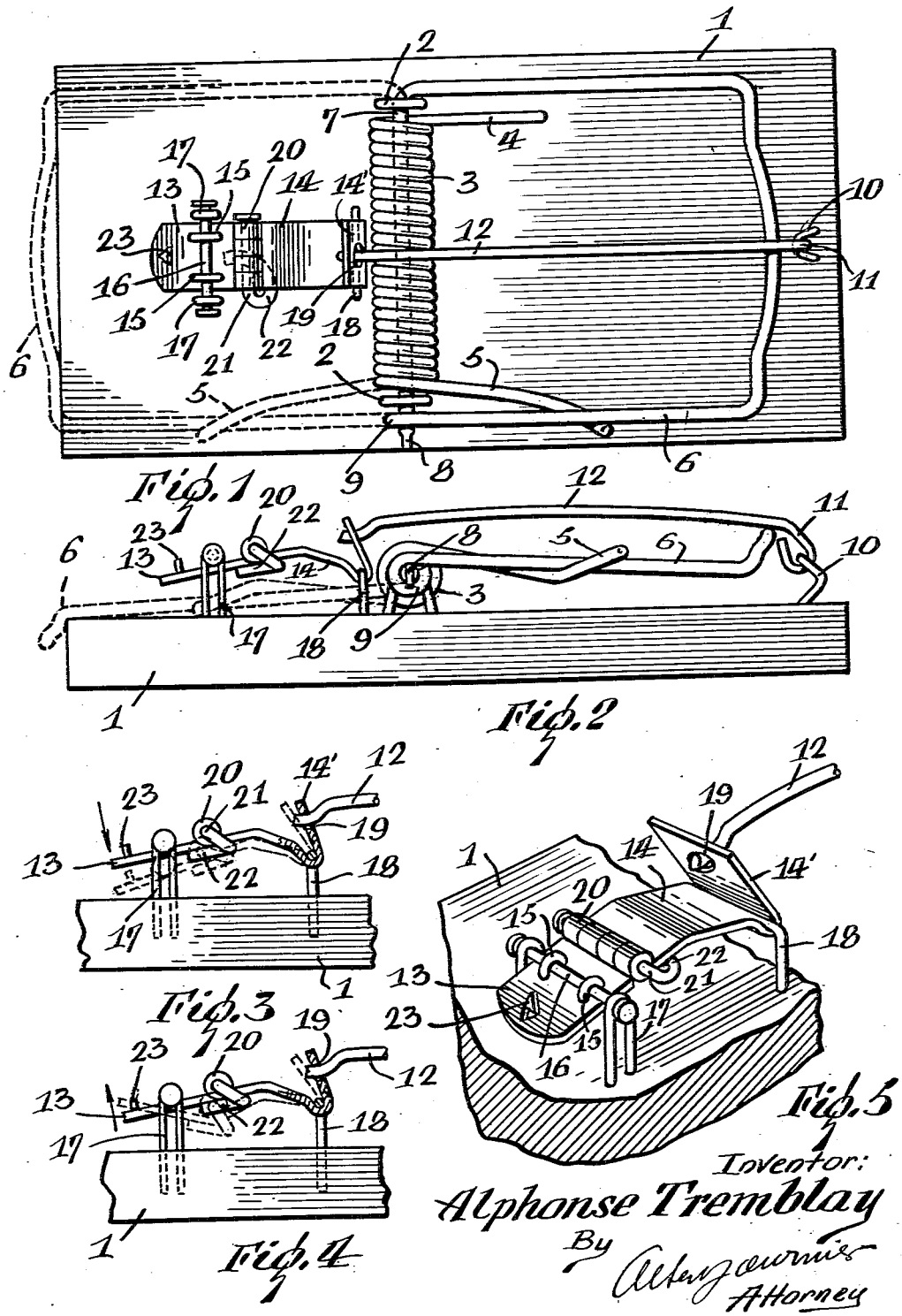

2,794,291

TRIGGER MECHANISM FOR RODENT TRAPS

Alphonse Tremblay, St. Charles Borromee, La Decharge, Quebec, Canada

Application July 2, 1956, Serial No. 595,207

Claims priority, application Canada January 28, 1956

1 Claim. (Cl. 43—81)

The present invention relates to a rodent trap.

More particularly, the invention relates to a novel trigger mechanism for a spring-loaded jaw of a trap for rodents, such as rats and mice.

The principal object of the invention is to provide a trigger mechanism which is very sensitive, whether the animal pulls or pushes on the bailt, that is, a trigger mechanism which is actuated by a very slight displacement in either of two opposite directions.

Another object of the invention is to provide a novel trigger mechanism which is applicable to some conventional types of spring-loaded jawed traps, without substantially modifying the structures thereof.

Still another object of the invention is to provide such a novel trigger mechanism which is easy and economical of manufacture.

In accordance with the invention, the trigger mechanism comprises two plates or members pivotally assembled together as a unit by means of a pin, one end of which is bent to present a curved portion or loop positioned under the adjacent ends of both of the plates. One of the plates is formed with a curved or bent portion provided with an aperture in which is received the free end of a lever serving to retain the spring-loaded jaw of the trap in operative, open position. The other plate is pivotally supported on a pin and is mounted so as to be above the base of the trap.

The invention is fully disclosed by way of example in the following description and in the accompanying drawings in which:

Figure 1 is a plan view of a trap embodying the invention;

Figure 2 is a side view of Figure 1;

Figure 3 is a fragmentary view of Figure 2, showing the trigger mechanism partly in section;

Figure 4 is a view similar to that of Figure 3, but showing the trigger mechanism in another position; and Figure 5 is a fragmentary perspective view showing the trigger mechanism in operative position.

Reference to these views will now be made by use of like characters which are employed to designate corresponding parts throughout.

Figures 1 and 2 show a trap of the kind wherein a spring-loaded jaw serves to close over the rodent—rat or mouse—to kill or crush the same.

Such trap comprises a base 1 of rectangular shape, on which a jaw 6 is pivotally mounted. The jaw is formed of a length of wire presenting a straight portion 7 which is journalled in U-shaped hooks 2 fixed to the base. One end of the jaw is formed with an eye 9 through which the opposite end of the jaw, more particularly the end of the portion 7, projects. The projecting end of the portion 7 is flattened as at 8, so that the eye 9 formed on the end of the jaw is retained in assembled position on the portion 7.

Mounted on the portion 7 of the jaw is a coil spring 3. The spring is formed at one end with a portion 4 adapted to bear against the base, and at its opposite end is formed with a portion 5 which engages under one leg of the jaw. The spring is tensioned to rotate the jaw 6, on the axis of its portion 7, counter-clockwise as seen in Figure 2, to close over the rodent.

Fixed to the base is a hook 10 to which is pivotally connected one end of a lever 12, as by an eye 11.

The lever serves to retain the jaw 6 in operative, loaded position, when its free end is retained in the position shown in Figures 1 and 2, by a trigger mechanism according to this invention. The trap so far described is of a conventional type. Such a conventional type of trap includes a trigger mechanism comprising a single plate having an aperture on which the free end of the lever 12 is received to retain the jaw in operative, spring-loaded position.

As already stated, the present invention relates to a trigger mechanism. The trigger mechanism, as shown, includes two plates 13 and 14 pivotally connected together (as will be presently seen). The plate 13 has two hooks or eyes 15 forming journals through which a pin 16 projects and extends at opposite ends beyond the plate, to be slidably and rotatably received in inverted U-shaped members 17 secured to the base 1 and serving as slide bearings. The ends of the pin may be formed with heads, as shown.

The plate 14 is formed at one end—the free end—with an upwardly extending V-shaped portion or elbow 14' one leg of which is apertured as at 19 to receive the free end of the lever 12. The V-shaped portion presents an apex adapted to receive the straight transverse portion of an inverted U-shaped member 18. The tension in the lever 12 when in operative position as seen in Figure 1, tends bodily to lift the plate 14 and retain it in position, the transverse portion serving as an axis on which the plate 14 is rotatable.

The co-operating ends of the plates 13 and 14 are formed with spaced curled portions 20 forming hinge butts through which a hinge pin 21 projects, so that the two plates are pivotally connected together as aforesaid. One end of the pin is formed with a head, and its opposite end is formed with a curved portion or loop 22 adapted to lie under adjacent end portions of both of the plates 13 and 14, to be engaged thereby. Thus, as will be clearly seen, the straight portion of the pin serves as a common axis for both of the plates 13 and 14, but the relative displacement of the plates in one direction on their common axis is limited or determined by the engagement of the adjacent portions of the plates with the looped portion 22 (see Figure 3). On the other hand, the two plates are relatively displaceable on their common axis in the opposite direction (see dotted lines in Figure 4).

The plate 13 is formed with a sharp point or lug 23 on which the bait (not shown) is impaled. The bait is impaled on the point 23 before the trigger mechanism is set. The trigger mechanism is set and the trap is ready for operation, when the jaw is in loaded position and the overlying lever 12 has its free end received in the aperture 19 of the trigger mechanism, all as best shown in Figures 1 to 3.

If the rodent applies a downward pressure one the bait, the free (left-hand) end of the plate 13 lowers, as best seen by the dotted lines in Figure 3. As the plate 13 lowers, the pin 16 slides downwardly in the slide bearings 17. As the pin lowers, the plate 14 lowers therewith since the adjacent end portions of both plates bear on the looped portion 22 of the pin 21, so that both plates rotate counterclockwise as a unit on the axis of the transverse portion of the member 18. On the other hand, if the rodent lifts the free end of the plate 13, as by seizing and attempting to lift the bait off the lug 23, the plate 13 will pivot clockwise on the axis of the pin 16, rotating the plate 14 counterclockwise and displacing the upper extremity of the V-shaped portion of the plate and, therefore, releasing the lever 12, all as best seen in Figure 4.

Although a specific embodiment of the invention has been illustrated and described, it will be understood that various alterations in the details of construction may be made without departing from the scope of the invention as indicated by the appended claim.

What I claim is:

A trap for rodents comprising a base, a jaw pivotally mounted on said base, spring means for biasing said jaw from loaded to released position, a retaining lever pivotally connected at one end to said base for holding said jaw in loaded position, a trigger mounted on said base including a first plate pivotally connected to said base and having an upstanding elbow portion at one end provided with an aperture for receiving the other end of said retaining lever when said jaws are in loaded position, a second plate pivotally connected to said first plate, said pivot connection between said first and second plates including a hinge pin having an end portion looped to underlie adjacent portions of said plates to retain them in alignment when said elbow portion is connected to said retaining lever, said second plate having a transverse pin mounted thereon intermediate its ends, and guide means on said base for pivotally and releasably retaining said transverse pin above said base, whereby when a rodent depresses said second plate said transverse pin is released from its position above said base and said first and second plates are moved counter clockwise to release said elbow from engagement with said retaining lever, and whereby when a rodent rotates said second plate in a clockwise direction said first plate is moved in a counter clockwise direction to release said elbow from engagement with said retaining lever.

References Cited in the file of this patent

UNITED STATES PATENTS

| 214,119 | Earle | Apr. 8, 1879 |
| 1,456,377 | Harried | May 22, 1923 |
| 1,494,918 | Kleinpeter | May 20, 1924 |
| 2,224,616 | Sund | Dec. 10, 1940 |